United States Patent
Ward

(10) Patent No.: US 10,711,487 B2
(45) Date of Patent: Jul. 14, 2020

(54) AIRCRAFT WITH A PLURALITY OF AIRCRAFT DOORS

(71) Applicant: AIRBUS HELICOPTERS DEUTSCHLAND GMBH, Donauworth (DE)

(72) Inventor: Stephen Ward, Donaumuenster (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 386 days.

(21) Appl. No.: 15/784,397

(22) Filed: Oct. 16, 2017

(65) Prior Publication Data

US 2018/0106074 A1 Apr. 19, 2018

(30) Foreign Application Priority Data

Oct. 18, 2016 (EP) .................................. 16400046

(51) Int. Cl.
*B64C 1/14* (2006.01)
*E05B 41/00* (2006.01)
*B64D 47/08* (2006.01)
*B64D 45/00* (2006.01)
*H04N 7/18* (2006.01)

(52) U.S. Cl.
CPC ............ *E05B 41/00* (2013.01); *B64C 1/1423* (2013.01); *B64D 45/0005* (2013.01); *B64D 47/08* (2013.01); *H04N 7/18* (2013.01)

(58) Field of Classification Search
CPC ......... E05B 41/00; B64C 1/14; B64C 1/1407; B64C 1/1423; B64C 1/143; B64C 1/1438; B64C 1/1469
See application file for complete search history.

(56) References Cited

U.S. PATENT DOCUMENTS

| 5,519,543 | A | 5/1996 | Olsson et al. |
| 5,735,487 | A | 4/1998 | Abild et al. |
| 6,659,401 | B1 | 12/2003 | Semprini |
| 9,353,550 | B1 * | 5/2016 | Smith, III ............... E05B 41/00 |
| 9,637,235 | B2 * | 5/2017 | Pujol ..................... B64C 1/1407 |

(Continued)

FOREIGN PATENT DOCUMENTS

| CA | 2769796 A1 | 9/2012 |
| CA | 2909314 A1 | 10/2014 |

(Continued)

OTHER PUBLICATIONS

European Search Report for European Application No. EP 16400046, Completed by the European Patent Office, dated May 4, 2017, 6 pages.

(Continued)

*Primary Examiner* — Richard G Davis
(74) *Attorney, Agent, or Firm* — Brooks Kushman P.C.

(57) ABSTRACT

An aircraft with a plurality of aircraft doors, each aircraft door comprising at least one lock lever that is provided for engaging a counterpart in an engaged state for locking a respective aircraft door relative to the aircraft, wherein a real-time monitoring device is provided for generating a real-time representation of the at least one lock lever and the counterpart, the real-time representation being suitable for determining whether the at least one lock lever is in the engaged state.

20 Claims, 2 Drawing Sheets

(56) References Cited

U.S. PATENT DOCUMENTS

| | | | |
|---|---|---|---|
| 2005/0082429 A1* | 4/2005 | D'Alvia | B64C 1/1469 244/118.5 |
| 2007/0252038 A1* | 11/2007 | Santiago Alvarez | B64C 1/1469 244/118.1 |
| 2016/0090196 A1* | 3/2016 | Besettes | B64C 1/1407 244/129.5 |
| 2017/0241170 A1* | 8/2017 | Bernwanger, Jr. | E05B 77/22 |
| 2017/0362860 A1* | 12/2017 | Salter | F21S 43/16 |

FOREIGN PATENT DOCUMENTS

| | | |
|---|---|---|
| CN | 1160002 A | 9/1997 |
| CN | 103051874 A | 4/2013 |
| DE | 102008059123 A1 | 5/2010 |
| WO | 2004030336 A2 | 4/2004 |
| WO | 2014167038 A1 | 10/2014 |

OTHER PUBLICATIONS

Document No. 2003-14193, 69 FR 24501, May 3, 2004, Section 25.783, "Fuselage Doors", 4 pages.
Bahrami, Document Federal Aviation Administration, Advisory Circular, Apr. 25, 2005, "Fuselage Doors and Hatches", 19 pages.
Chinese First Office Action & Search Report dated Apr. 2, 2020 (With English Translation), Application No. 201710660440.3, Applicant Airbus Helicopters Deutschlang Gmbh, 11 Pages.
Chinese First Office Action & Search Report Application No. 201710660440.3 dated Apr. 2, 2020.

* cited by examiner

AIRCRAFT WITH A PLURALITY OF AIRCRAFT DOORS

CROSS-REFERENCE TO RELATED APPLICATIONS

This application claims priority to European patent application No. EP 16400046.5 filed on Oct. 18, 2016, the disclosure of which is incorporated in its entirety by reference herein.

BACKGROUND OF THE INVENTION

(1) Field of the Invention

The invention is related to a vehicle door with at least one lock lever that is provided for engaging a counterpart in an engaged state for locking the vehicle door at the associated vehicle. The invention is further related to an aircraft with a plurality of aircraft doors, each aircraft door comprising at least one lock lever that is provided for engaging a counterpart in an engaged state for locking a respective aircraft door relative to the aircraft.

(2) Description of Related Art

In general, aircraft doors must fulfil predefined airworthiness requirements in order to allow for a safe, secure and reliable operation of respective aircrafts. Such airworthiness requirements are defined in applicable safety regulations and specifications, such as the US-American Federal Aviation Regulations (FAR) and/or the European Certification Specifications (CS) from the European Aviation Safety Agency (EASA).

More specifically, according to EASA CS 25.783(f), resp. FAR 25.783(f), each aircraft door must be provided with means that allow for a direct visual inspection of an underlying door locking mechanism in order to determine whether the aircraft door is fully closed, latched and locked. Such a direct visual inspection is requested, as dispatch of a given aircraft may be permitted in some circumstances even if a flight deck indication, or other remote indication, of an unsafe aircraft door persists although all aircraft doors of the given aircraft are fully closed, latched and locked. In such circumstances, the dispatch should, nevertheless, not lead to hazardous or uncontrollable operation conditions of the given aircraft.

A direct visual inspection could e. g. be performed by providing a given aircraft door with one or more suitable viewing ports. More specifically, a viewing port could be provided that allows to visualize an underlying door locking mechanism of the given aircraft door through a respective door lining and insulation. However, such a viewing port is neither considered aesthetically pleasant, nor practically feasible in all circumstances.

In other words, in many cases a direct visual inspection by means of direct viewing, in particular via viewing ports, is impractical. In these cases, and provided that there is no failure mode possible, which could allow a false latched or locked indication, indirect viewing is permitted. As a result, such indirect viewing is commonly used.

Usually, indirect viewing for a visual inspection of an underlying door locking mechanism of a given aircraft door implies use of a mechanical arrangement that determines a respective mechanism status of the underlying door locking mechanism of the given aircraft door by using e. g. levers, shafts and drive pins that are interconnected to activate an indication flag that indicates the respective mechanism status, so that a reliable, positive indication of the respective mechanism status of the underlying door locking mechanism can be obtained. More specifically, in order to guarantee sufficient reliability, such a mechanical arrangement usually implements an indication arrangement that comprises a mechanism that drives an indicator flag. A shaft in turn is provided with an indicator flag, which rotates behind an indicator plate. A slot in this indicator plate provides viewing access to a small area of the flag, which conventionally comprises a green and a red section. If the green section shows up in the slot, the underlying door locking mechanism is supposed to be in locked state and, if the red section shows up in the slot, the underlying door locking mechanism is supposed to be in unlocked state.

However, such a mechanical arrangement conventionally requires a comparatively high number of interconnected components. Furthermore, surrounding adjacent parts of a respective door structure of the given aircraft door must be equipped with bushes and bearings to minimize system friction and ensure required endurance life. Therefore, this mechanical arrangement involves significant weight and cost implications for the given aircraft door.

It should be noted that, more generally, security systems are known, which allow to prevent an inadvertent deployment of aircraft doors or which allow a direct or indirect viewing of aircraft equipment from an inside of a given aircraft. Exemplary security systems are briefly discussed hereinafter.

For instance, the document WO 2014/167038 A1 describes a security system that comprises video cameras for producing real-time images and, more particularly, videos of a surrounding of a given aircraft. In this security system, the video cameras, i. e. respective camera lenses, replace aircraft windows and, more particularly, windows in aircraft doors. The security system further comprises illumination sources for illuminating the surrounding in at least one radiation range, respectively. However, this security system is not suitable for determining whether a given aircraft door is fully closed, latched and locked.

The document CA 2 769 796 A1 describes a similar security system in the form of a cockpit video system with multiple video cameras, a video processing module and a monitor. Therein, the video cameras are attached to an exterior of a given aircraft for producing real-time images and, more particularly, videos of a surrounding of the given aircraft. However, even if the video cameras would be used to show the aircraft doors, this would only be suitable to determine whether the aircraft doors are fully closed, but not for determining whether the aircraft doors are latched and locked.

The document DE 10 2008 059 123 A1 describes a security system that is implemented by means of an inspection apparatus that comprises a mirror arrangement used for visualizing outside components of a given aircraft. However, even if the inspection apparatus would be used to show the aircraft doors, this would only be suitable to determine whether the aircraft doors are fully closed, but not for determining whether the aircraft doors are latched and locked.

Other visual inspection devices in other technical domains are also already known. An exemplary visual inspection device in the field of down holes is e. g. described in the documents U.S. Pat. No. 5,519,543, WO2004030336 and U.S. Pat. No. 6,659,401.

BRIEF SUMMARY OF THE INVENTION

It is, therefore, an object of the present invention to provide a new aircraft door and, more generally, a new vehicle door, which allows for a simplified, secure, safe and reliable determination of an associated latched and locked state. Furthermore, it is an object of the present invention to provide a new aircraft having such a new aircraft door.

This object is solved by a vehicle door with at least one lock lever that is provided for engaging a counterpart in an engaged state for locking the vehicle door at the associated vehicle, the vehicle door comprising the features of claim 1. The object is further solved by an aircraft with a plurality of aircraft doors, each aircraft door comprising at least one lock lever that is provided for engaging a counterpart in an engaged state for locking a respective aircraft door relative to the aircraft, the aircraft comprising the features of claim 10.

More specifically, the present invention provides a vehicle door with at least one lock lever that is provided for engaging a counterpart in an engaged state for locking the vehicle door at the associated vehicle. A real-time monitoring device is provided for generating a real-time representation of the at least one lock lever and the counterpart, the real-time representation being suitable for determining whether the at least one lock lever is in the engaged state.

It should be noted that it is commonly known that the at least one lock lever of the vehicle door and the counterpart are key mechanism elements of a respective door locking mechanism, which are essential for door locking. Therefore, these two key mechanism elements are preferably marked and a respective alignment of their markings will show without ambiguity that the two key mechanism elements are correctly engaged in each other, and therefore locking of the vehicle door is ensured.

According to one aspect, an image formation device is provided and, preferably, mounted adjacent to the at least one lock lever of the vehicle door and the counterpart, preferentially on or in a respective door structure. The image formation device will relay a respective status of the at least one lock lever of the vehicle door and the counterpart to a display device, which is either arranged on the vehicle door, adjacent to the vehicle door within a vehicle cabin of the associated vehicle, or directly in a respective vehicle cockpit. Arrangement of the display device directly on the vehicle door may advantageously be used for relaying also current conditions outside of the vehicle door, if a further image formation device is provided by means of a camera system that replaces a conventional door window.

Preferably, the image formation device comprises an integrated backlight to ensure visibility under all external or internal lighting conditions. Furthermore, a respective lens of the image formation device is preferably coated to provide resistance to scratching, to prevent fogging and to ensure resistance to fluids commonly used in the operation and cleaning of vehicles, in particular aircrafts. Furthermore, the image formation device preferably utilizes an already existing power supply that is e. g. running through an existing door wire harness.

Advantageously, by provision of the real-time monitoring device a comparatively large reduction in respectively required space for its implementation compared to available prior art means results, leading to more available space inside an underlying door structure for other door systems and less intrusion beyond an inner mould line into the associated vehicle. Also, the visual inspection provision by means of the real-time monitoring device may not only be available in the vicinity of the vehicle door, it could also be relayed to a screen anywhere in the associated vehicle.

According to a preferred embodiment, the real-time monitoring device comprises an image formation device.

According to a further preferred embodiment, the image formation device comprises at least video formation capabilities, wherein the real-time representation is a video.

According to a further preferred embodiment, the image formation device further comprises still image formation capabilities, wherein the real-time representation is switchable between the video and a still image.

According to a further preferred embodiment, a fixation member is provided that rigidly attaches the image formation device to a door structure of the vehicle door.

According to a further preferred embodiment, a control panel is provided for controlling operation of the image formation device.

The present invention further provides an aircraft with a plurality of aircraft doors. Each aircraft door comprises at least one lock lever that is provided for engaging a counterpart in an engaged state for locking a respective aircraft door at the aircraft. A real-time monitoring device is provided for generating a real-time representation of the at least one lock lever and the counterpart, the real-time representation being suitable for determining whether the at least one lock lever is in the engaged state.

According to a preferred embodiment, the respective aircraft door is a cabin access door.

According to a further preferred embodiment, the real-time monitoring device comprises an image formation device that comprises at least video formation capabilities, wherein the real-time representation is a video.

According to a further preferred embodiment, the image formation device further comprises still image formation capabilities, wherein the real-time representation is switchable between the video and a still image.

According to a further preferred embodiment, at least one display screen is provided for displaying the real-time representation.

According to a further preferred embodiment, the at least one display screen is provided at the respective aircraft door, in vicinity of the respective aircraft door and/or on an aircraft flight deck of the aircraft.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
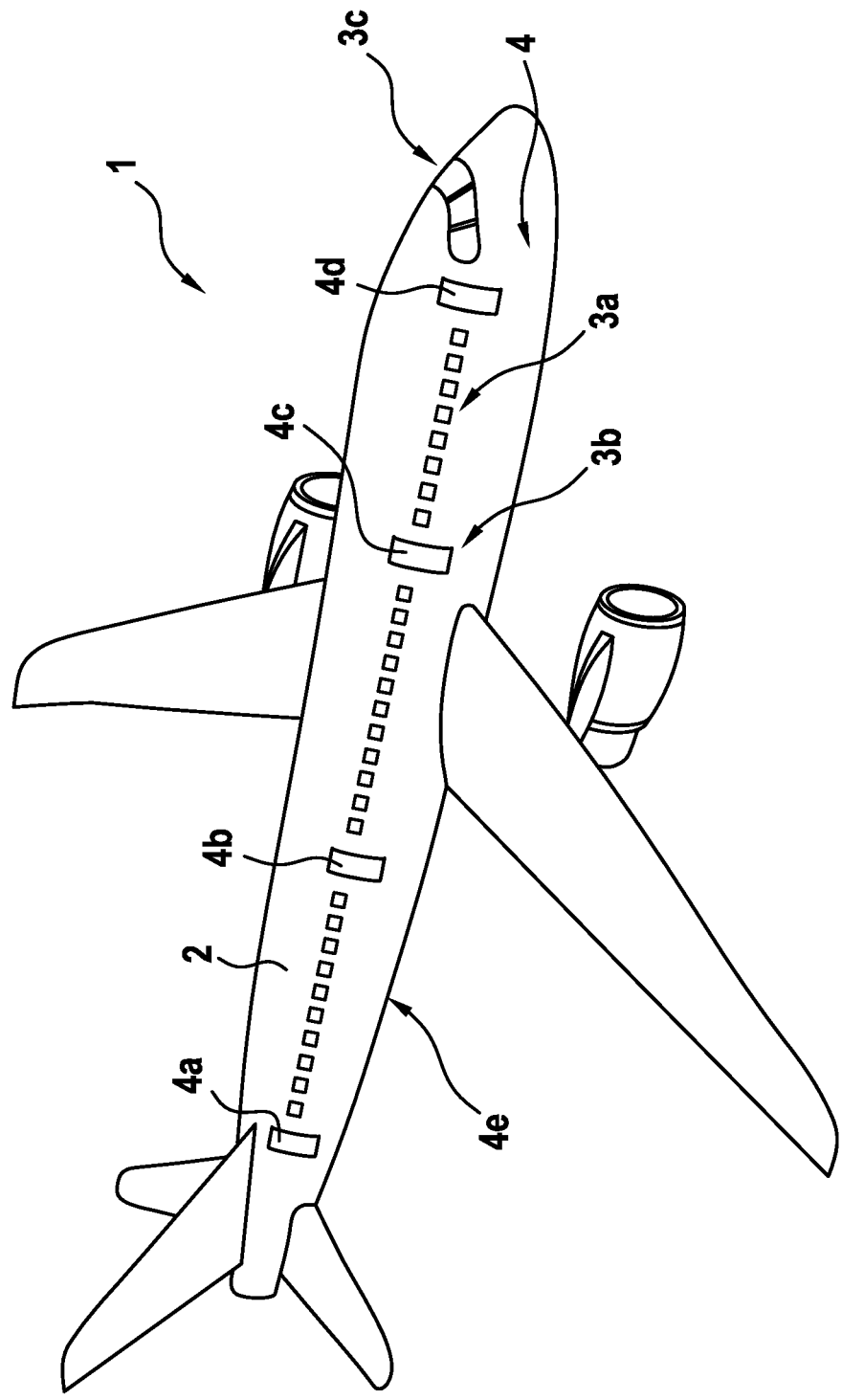
FIG. 1 shows a perspective view of an aircraft having an aircraft cabin door according to the present invention.

FIG. 1 shows an aircraft 1 with an aircraft airframe 2.

The aircraft 1 illustratively comprises a passenger cabin 3*a*, a cargo deck 3*b* and a flight deck or cockpit 3*c*. Preferably, the aircraft 1 is accessible via a plurality of doors 4, which exemplarily comprises several cabin access doors 4*a*, 4*b*, 4*c* and 4*d*, as well as one or more cargo deck access doors 4*e*. By way of example, the passenger cabin 3*a* and the flight deck 3*c* are accessible via the cabin access doors 4*a*, 4*b*, 4*c* and 4*d*, and the cargo deck 3*b* is accessible via the one or more cargo deck access doors 4*e*.

The plurality of doors 4 is preferably adapted to close the airframe, i. e. fuselage 2 of the aircraft 1, preferentially in a fluid-tight manner. According to one aspect, at least one and preferably each one of the plurality of doors 4 is embodied for allowing a determination of a respective current operation state thereof by means of a visual inspection. This visual inspection is preferentially suitable for determining whether a respective one of the plurality of doors 4 is fully closed, latched and locked.

Illustratively, the aircraft 1 is an airplane. However, the present invention is not limited to airplanes. Instead, any vehicle that may be equipped with doors that allow a visual inspection of a respective current operation state thereof are likewise contemplated. By way of example, the present invention may alternatively be applied to vessels, such as ships and so on. Consequently, the present invention is not limited to aircraft doors, but can likewise be applied to any arbitrary vehicle door. However, for purposes of illustration, the present invention is hereinafter described with respect to aircraft doors and, only exemplarily, to aircraft cabin access doors.

Figure 2:
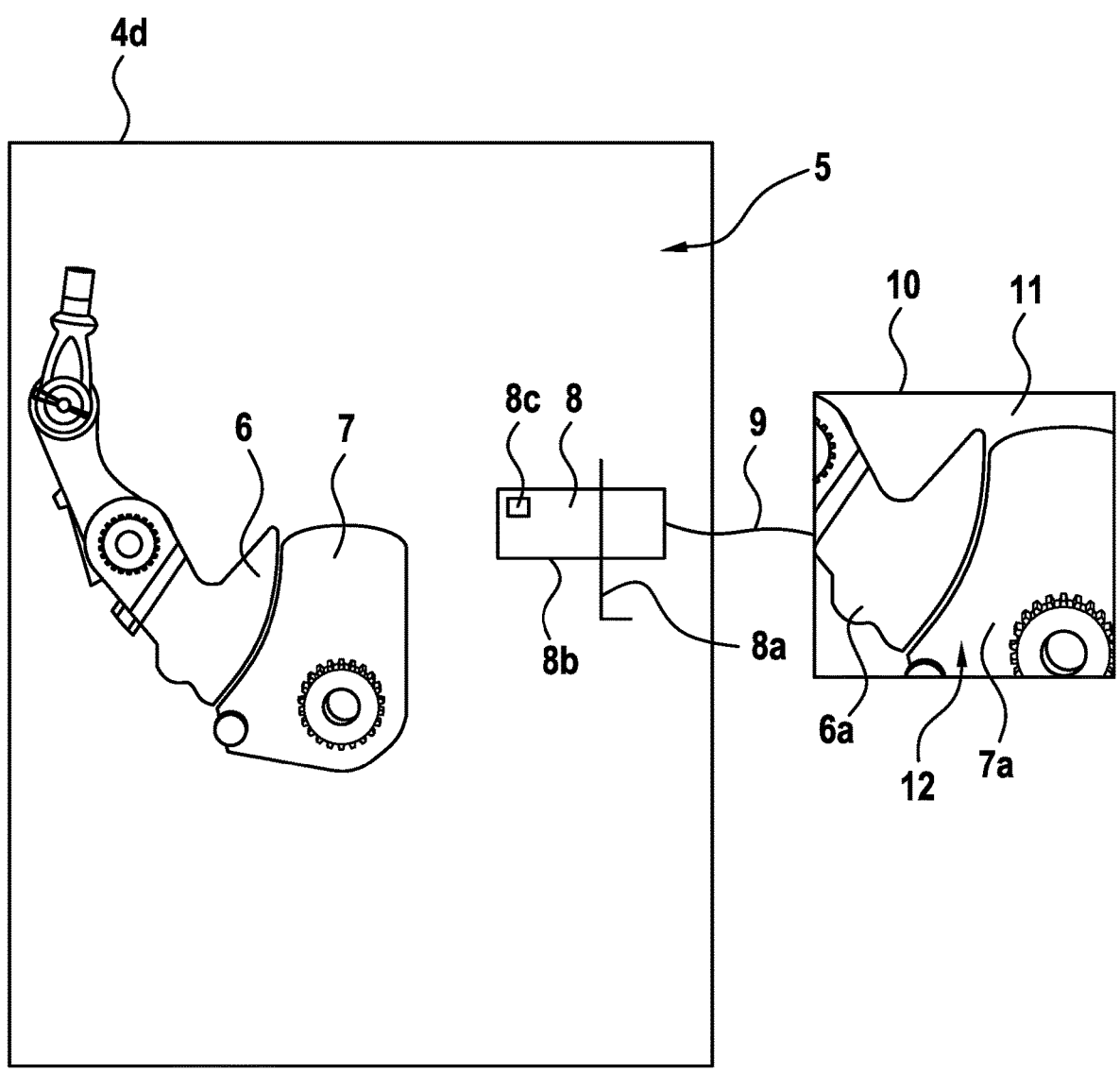
FIG. 2 shows a schematic view of an aircraft cabin door of the aircraft of FIG. 1.

FIG. 2 shows the cabin access door 4d of FIG. 1, which is hereinafter described in more detail. However, it should be noted that the cabin access door 4d is merely described representatively for all aircraft doors 4a, 4b, 4c, 4e of the aircraft 1 of FIG. 1. Furthermore, it should be noted that the cabin access door 4d is even more generally only described by way of example for an arbitrary vehicle door, to which the present invention can be applied.

According to one aspect, the cabin access door 4d comprises at least one lock lever 6 that is provided for engaging a counterpart 7 in an engaged state for locking the cabin access door 4d relative to the aircraft 1 of FIG. 1. The at least one lock lever 6 is preferably moveably mounted to an associated door structure 5 of the cabin access door 4d and the counterpart 7 is preferably also mounted to the associated door structure 5, preferentially also moveably, but may alternatively also be mounted rigidly or moveably to the aircraft airframe 2 of FIG. 1.

As already described above, safety is of paramount importance in aircraft operation and dispatch reliability is critical as well in order to ensure airline profitability. Therefore, prior to each take-off of the aircraft 1, a check is performed by a respective flight crew that the plurality of doors 4 is correctly closed. Furthermore, the above-mentioned airworthiness requirements require a visual inspection provision to determine a respective current operation state of each one of the plurality of doors 4 in order to determine whether to permit flight even with a remote indication, e. g. on the flight deck 3c, of an unsafe door. This visual inspection must allow to determine, without ambiguity, if the door is fully closed, latched and locked.

As also already described above, the at least one lock lever 6 and the counterpart 7 are considered as being the key mechanism elements of a respective door locking mechanism, which are essential for door locking. In other words, when the at least one lock lever 6 and the counterpart 7 are correctly engaged in each other, locking of the cabin access door 4d is considered as being ensured. However, it should be noted that a particular implementation of the at least one lock lever 6 and the counterpart 7 are not part of the present invention, as they are well-known to the person skilled in the art. Furthermore, a detailed implementation of the respective door locking mechanism as such is also not part of the present invention and well-known to the person skilled in the art. Thus, more detailed descriptions thereof are omitted for brevity and conciseness of the description.

Finally, as also already described above, a simple viewing port would suffice for determining whether the at least one lock lever 6 and the counterpart 7 are correctly engaged in each other. However, such a simple viewing port is usually not practical as the at least one lock lever 6 and the counterpart 7 must be visible, but tend to be deep in the associated door structure 5, behind other mechanism parts, making viewing extremely difficult or impossible. Therefore, according to one aspect the cabin access door 4d comprises a real-time monitoring device 8 that is provided for generating a real-time representation 12 of the at least one lock lever 6 and the counterpart 7. Preferably, the real-time monitoring device 8 comprises an image formation device 8b that is preferentially rigidly attached to the associated door structure 5 of the cabin access door 4d by means of a fixation member 8a, e. g. a dedicated support bracket.

The image formation device 8b preferably comprises at least video formation capabilities. By way of example, the image formation device 8b is implemented by means of a video camera or camcorder or, alternatively, by means of a digital camera with video formation capabilities. By way of example, so-called charge-coupled device (CCD) or 3CCD cameras or camcorders can be used. In any case, the camera or camcorder that is used for implementing the image formation device 8b is preferably a miniaturized device, i. e. a miniature camera or camcorder, so that a required installation space at respectively in the associated door structure 5 can be minimized.

Furthermore, the image formation device 8b preferably comprises a backlight device 8c. This guarantees a reliable and failure-free operation of the image formation device 8b in all possible lighting conditions.

Moreover, a respective lens of the image formation device 8b is preferably coated to provide resistance to scratching, to prevent fogging and to ensure resistance to fluids commonly used in the operation and cleaning of the aircraft 1 of FIG. 1.

Furthermore, the image formation device 8b preferably utilizes an already existing power supply that is e. g. running through an existing door wire harness.

In summary, the image formation device 8b is preferentially selected from a wide range of available cameras and camcorders that are associated with a suitable backlight device and preferably comprise at least video formation capabilities and, preferentially, also still image formation capabilities. Thus, the real-time representation 12 can either be a video, or a still image. Preferably, the real-time representation 12 is switchable between the video and the still image, so that the video can e. g. be used for visual inspection purposes, while the still image is used for documentation and observation purposes.

According to one aspect, the real-time representation 12 is suitable for determining whether the at least one lock lever 6 is in the engaged state. In particular, the cabin access door 4d is considered safely closed, latched and locked when the at least one lock lever 6 is engaged in the counterpart 7. Therefore, the real-time representation 12 comprises at least a representation 6a of the at least one lock lever and a representation 7a of the counterpart.

In the above described implementation variants, the representation 6a of the at least one lock lever 6 corresponds to an image, i. e. a real-time visualization of the at least one lock lever 6, and the representation 7a of the counterpart 7 corresponds to an image, i. e. a real-time visualization of the counterpart 7. Thus, a respective current operation state of the at least one lock lever 6 and the counterpart 7 can unambiguously be determined, so that a reliable, safe and secure determination can be made on whether the at least one lock lever 6 is in the engaged state.

According to one aspect, the representations 6a, 7a, i. e. the real-time representation 12, are/is displayed on a display screen 11. The latter is preferably provided at a control panel 10 that, in turn, is at least provided for controlling operation of the image formation device 8b. However, the display screen 11 must not necessarily define an integral part of the control panel 10 and can likewise be provided as a separate component.

The control panel 10 is preferably connected to the image formation device 8b by means of a suitable signal transmission connection 9. This signal transmission connection 9 is preferentially implemented by means of wiring or, alternatively, via a radio link, e. g. using the Bluetooth® standard. The control panel 10 may e. g. further be connected to another image formation device that can be used to replace e. g. a window that would otherwise be provided in the cabin access door 4d. This would enable a further reduction of cost, weight and space.

The control panel 10 and the display screen 11 can be mounted to the associated door structure 5 of the cabin access door 4d or, alternatively, to the aircraft airframe 2 of FIG. 1, preferably in the vicinity of the cabin access door 4d. Still alternatively, either one of the control panel 10 and the display screen 11 is mounted to the associated door structure 5 of the cabin access door 4d, while the other one is mounted to the aircraft airframe 2 of FIG. 1, preferably in the vicinity of the cabin access door 4d. Still alternatively, or in addition thereto, the real-time representation 12 can be transferred from the image formation device 8b to the aircraft flight deck 3c of FIG. 1 for display.

According to one aspect, the control panel 10 is configured to allow activation of the image formation device 8b and/or the display screen 11, e. g. by means of a suitable switch. This advantageously allows use of the image formation device 8b only in case of need. More specifically, in case of a remote indication of an unsafe door when the cabin access door 4d seems to be correctly closed, a crew member could perform a visual inspection of the affected door, i. e. the cabin access door 4d. Part of this inspection would be to activate the image formation device 8b using the switch provided on the control panel 10. A respective video or still image caught by the image formation device 8b would then be relayed to the display screen 11 for inspection by the crew member.

It should be noted that modifications to the above described embodiments are within the common knowledge of the person skilled in the art and, thus, also considered as being part of the present invention. For instance, while only a single lock lever and its counterpart are illustrated together with a single real-time monitoring device in FIG. 2, it should be clear to the person skilled in the art that preferably each lock lever/counterpart arrangement is provided with an associated real-time monitoring device.

REFERENCE LIST

1 aircraft
2 aircraft airframe
3a aircraft passenger cabin
3b aircraft cargo deck
3c aircraft flight deck
4 plurality of aircraft doors
4a, 4b, 4c, 4d cabin access doors
4e cargo deck access door
5 door structure
6 lock lever
6a lock lever representation
7 lock lever engaging counterpart
7a lock lever engaging counterpart representation
8 real-time monitoring device
8a real-time monitoring device fixation member
8b image formation device
8c backlight device
9 signal transmission connection
10 control panel
11 display screen
12 real-time representation

What is claimed is:

1. A vehicle door comprising:
a door structure;
at least one lock lever moveably mounted to the door structure;
a counterpart mounted to the door structure and engageable with the at least one lock lever in an engaged state for locking the vehicle door of an associated vehicle, and
a real-time monitoring device configured for generating a real-time representation of the at least one lock lever and the counterpart, the real-time representation being suitable for determining whether the at least one lock lever is in the engaged state;
wherein the real-time monitoring device comprises an image formation device attached to the door structure.

2. The vehicle door of claim 1,
wherein the image formation device comprises at least video formation capabilities, wherein the real-time representation is a video.

3. The vehicle door of claim 2,
wherein the image formation device further comprises still image formation capabilities, wherein the real-time representation is switchable between the video and a still image.

4. The vehicle door of claim 1,
wherein a fixation member is provided that rigidly attaches the image formation device to a door structure of the vehicle door.

5. The vehicle door of claim 1,
wherein a control panel is provided for controlling operation of the image formation device.

6. The vehicle door of claim 5,
wherein the control panel comprises a display screen for displaying the real-time representation.

7. The vehicle door of claim 1,
wherein the image formation device comprises a backlight device.

8. The vehicle door of claim 7,
wherein the associated vehicle is an aircraft, wherein the vehicle door defines a cabin access door of the aircraft.

9. An aircraft with a plurality of aircraft doors, each aircraft door being a vehicle door as in claim 1 and comprising at least one lock lever that is provided for engaging a counterpart in an engaged state for locking a respective aircraft door relative to the aircraft, wherein a real-time monitoring device is provided for generating a real-time representation of the at least one lock lever and the counterpart, the real-time representation being suitable for determining whether the at least one lock lever is in the engaged state.

10. The aircraft of claim 9,
wherein the respective aircraft door is a cabin access door.

11. The aircraft of claim 9,
wherein the real-time monitoring device comprises an image formation device that comprises at least video formation capabilities, wherein the real-time representation is a video.

12. The aircraft of claim 11,
wherein the image formation device further comprises still image formation capabilities, wherein the real-time representation is switchable between the video and a still image.

13. The aircraft of claim 9,
wherein at least one display screen is provided for displaying the real-time representation.

14. The aircraft of claim 13,
wherein the at least one display screen is provided at the respective aircraft door, in vicinity of the respective aircraft door and/or on an aircraft flight deck of the aircraft.

15. The vehicle door of claim 1, wherein the real-time representation of the at least one lock lever and the counterpart comprise a real-time visualization of the at least one lock lever and a real-time visualization of the counterpart.

16. The vehicle door of claim 1, wherein the image formation device comprises a camera focused on the at least one lock lever and the counterpart.

17. A vehicle door comprising:
a door structure;
at least one lock lever moveably mounted to the door structure;
a counterpart mounted to the door structure and engageable with the at least one lock lever in an engaged state for locking the vehicle door of an associated vehicle, and
a real-time monitoring device for generating a real-time representation of the at least one lock lever and the counterpart, the real-time representation being suitable for determining whether the at least one lock lever is in the engaged state;
wherein the image formation device comprises at least video formation capabilities, wherein the real-time representation is a video.

18. The vehicle door of claim 17,
wherein the image formation device further comprises still image formation capabilities, wherein the real-time representation is switchable between the video and a still image.

19. A vehicle door comprising:
a door structure;
a lock lever moveably mounted to the door structure;
a counterpart mounted to the door structure and engageable with the lock lever in an engaged state for locking the vehicle door of an associated vehicle, and
a real-time monitoring device comprising an image formation device attached to the door structure, the image formation device being configured to generate a real-time representation of the lock lever and the counterpart, the real-time representation being a real-time visualization of the lock lever and a real-time visualization of the counterpart to show whether the lock lever is in the engaged state with the counterpart.

20. The vehicle door of claim 19,
wherein the image formation device comprises a miniature camera mounted on the door structure, the miniature camera having video formation capabilities and still image formation capabilities, wherein the real-time representation is a video or a still image of the at least one lock lever and the counterpart, wherein the real-time representation is switchable between the video and the still image.

* * * * *